(12) United States Patent
Song

(10) Patent No.: US 11,752,680 B2
(45) Date of Patent: Sep. 12, 2023

(54) FABRICATION OF HOLLOW FIBER MATERIALS HAVING SEALED CHAMBERS

(71) Applicant: The Boeing Company, Chicago, IL (US)

(72) Inventor: Weidong Song, Woodinville, WA (US)

(73) Assignee: The Boeing Company, Chicago, IL (US)

(*) Notice: Subject to any disclaimer, the term of this patent is extended or adjusted under 35 U.S.C. 154(b) by 294 days.

(21) Appl. No.: 16/801,327

(22) Filed: Feb. 26, 2020

(65) Prior Publication Data

US 2021/0260807 A1    Aug. 26, 2021

(51) Int. Cl.
*B29C 48/30* (2019.01)
*B29C 48/05* (2019.01)
*B29C 48/92* (2019.01)
*B29C 48/78* (2019.01)

(52) U.S. Cl.
CPC .............. *B29C 48/30* (2019.02); *B29C 48/05* (2019.02); *B29C 48/78* (2019.02); *B29C 48/92* (2019.02)

(58) Field of Classification Search
CPC ......... B29C 48/05; B29C 48/09; B29C 48/30; B29C 48/88; B29C 48/9115; B29C 48/912; B29C 48/32; B29L 2031/731; B29L 2031/7322
USPC ...... 264/563, 564, 565; 425/72.1, 72.2, 5, 6, 425/10
See application file for complete search history.

(56) References Cited

U.S. PATENT DOCUMENTS

| | | | | |
|---|---|---|---|---|
| 2,437,884 A | * | 3/1948 | Maynard | B29C 48/03 156/244.14 |
| 3,196,194 A | * | 7/1965 | Ely, Jr. | F16L 11/12 264/209.3 |
| 3,303,243 A | * | 2/1967 | Hughes | B29C 66/80 174/74 A |
| 3,461,492 A | * | 8/1969 | Carter | D01D 1/065 425/132 |
| 3,949,031 A | * | 4/1976 | Fairbanks | B29C 44/468 428/313.5 |
| 3,949,110 A | * | 4/1976 | Nakajima | B29C 65/028 522/155 |
| 4,303,603 A | * | 12/1981 | Torobin | C03B 19/1075 264/129 |
| 4,303,729 A | * | 12/1981 | Torobin | F16L 59/08 428/407 |

(Continued)

OTHER PUBLICATIONS

Faserverbundwerkstoffe Technical Data; Hollow glass fibres (H-glass) Jun. 2010.

*Primary Examiner* — Seyed Masoud Malekzadeh
(74) *Attorney, Agent, or Firm* — Duft & Bornsen, PC

(57) ABSTRACT

Systems and methods are provided for fabricating and utilizing segmented hollow fibers. One embodiment is a method for fabricating a hollow fiber. The method includes disposing injection needles at orifices of a die, loading the die with a pool of molten material, driving the molten material through the orifices of the die, and iteratively injecting a gas into the molten material at the orifices via the injection needles and pausing injecting the gas as the molten material is driven through the orifices of the die, resulting in discrete hollow chambers within molten material exiting the die. The method also includes cooling the molten material into a hollow fiber that includes the discrete hollow chambers.

18 Claims, 12 Drawing Sheets

(56) References Cited

U.S. PATENT DOCUMENTS

| | | | | |
|---|---|---|---|---|
| 4,303,736 | A * | 12/1981 | Torobin | F16L 59/08 |
| | | | | 428/407 |
| 4,380,520 | A * | 4/1983 | Taylor | D01D 5/24 |
| | | | | 264/564 |
| 4,449,901 | A * | 5/1984 | Wang | B22D 11/01 |
| | | | | 425/10 |
| 4,496,616 | A * | 1/1985 | McLoughlin | B32B 27/08 |
| | | | | 428/188 |
| 4,548,196 | A * | 10/1985 | Torobin | B29C 70/58 |
| | | | | 126/654 |
| 4,659,534 | A * | 4/1987 | Matsubayashi | G11B 5/73927 |
| | | | | 264/235.6 |
| 8,562,320 | B2 * | 10/2013 | Ohmi | B29C 48/32 |
| | | | | 425/467 |
| 8,568,628 | B2 * | 10/2013 | Norikane | G03G 9/0819 |
| | | | | 425/10 |
| 2008/0283183 | A1 * | 11/2008 | Yamada | D06N 7/0071 |
| | | | | 156/251 |
| 2011/0020574 | A1 * | 1/2011 | Mackley | B29C 48/05 |
| | | | | 425/72.1 |
| 2014/0225301 | A1 * | 8/2014 | Xu | B29C 48/875 |
| | | | | 425/144 |
| 2016/0017108 | A1 * | 1/2016 | Tokiwa | C08J 9/18 |
| | | | | 264/45.4 |
| 2018/0281998 | A1 * | 10/2018 | Saguchi | B65B 9/24 |

* cited by examiner

FABRICATION OF HOLLOW FIBER MATERIALS HAVING SEALED CHAMBERS

FIELD

The disclosure relates to the field of fabrication, and in particular, to fabrication of fibers.

BACKGROUND

Designers of aircraft components continue to seek out new materials and systems that attend to the necessities of flight. For example, because reductions in weight result in increased fuel economy for aircraft, designers seek out aircraft flooring that is light weight. Furthermore, designers seek out flooring that is durable, non-slip, and easy to clean. Presently, a variety of technologies for flooring have been implemented. However, conventional technologies for flooring exhibit example drawbacks. For example, carpeting is both heavy and difficult to clean. Hollow fiber carpet remains undesirable, because moisture is retained within the hollow fibers, increasing the difficulty of cleaning and the likelihood of water retention, which increases weight. Similar challenges are encountered for a variety of aircraft components when attempting to find a balance between weight, functionality, and durability. As a further example, designers continue to seek out advanced insulation materials to maintain a desired cabin temperature. However, hollow fibers remain unsuitable for this task as well, because air within the hollow fibers is quickly removed via passive airflow. Thus, the value of hollow fibers for insulation is less than desired.

Therefore, it would be desirable to have a method and apparatus that take into account at least some of the issues discussed above, as well as other possible issues.

SUMMARY

Embodiments described herein provide segmented hollow fiber materials, wherein individual hollow fibers each include a plurality of sealed compartments that prevent water entry. This technology has numerous applications, including applications pertaining to aircraft flooring and insulation. With regard to aircraft flooring, this technology enables greater weight savings than traditional hollow fiber carpeting, because less water can be trapped within the fibers of the carpet. Furthermore, because the hollow fibers are sealed, it is less difficult to clean the hollow fibers, and it is less likely for dirt or debris to become trapped within the fibers. With regard to aircraft insulation, segmented hollow fiber materials can be utilized for insulation blankets at aircraft, which reduces weight and increases thermal efficiency in comparison to fiberglass blankets that have been used previously for insulation.

One embodiment is a method for fabricating a hollow fiber. The method includes disposing injection needles at orifices of a die, loading the die with a pool of molten material, driving the molten material through the orifices of the die, and iteratively injecting a gas into the molten material at the orifices via the injection needles and pausing injecting the gas as the molten material is driven through the orifices of the die, resulting in discrete hollow chambers within molten material exiting the die. The method also includes cooling the molten material into a hollow fiber that includes the discrete hollow chambers.

A further embodiment is a method for fabricating a hollow fiber. The method includes acquiring a hollow fiber made from a material, heating the hollow fiber to a tacking temperature of the material, compressing portions of the hollow fiber at lengthwise intervals, causing walls of the hollow fiber to tack together and form airtight chambers, thereby forming a segmented hollow fiber, and cooling the hollow fiber below the tacking temperature.

Another embodiment is a manufacture in the form of a fiber. The fiber includes exterior walls of material, and a series of airtight chambers within the fiber that are separated by lengthwise intervals.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1A:
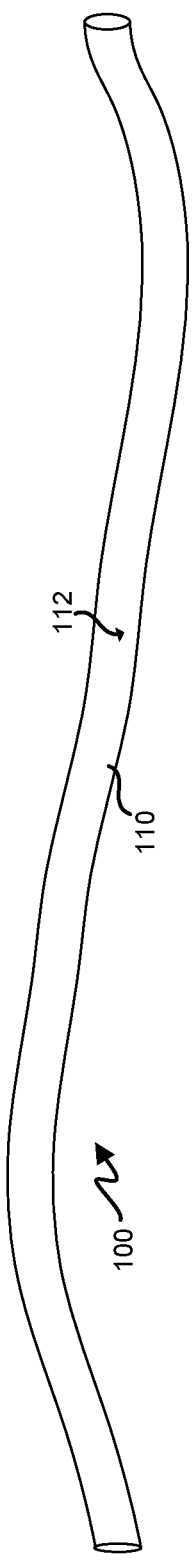
FIGS. 1A-1B depict outside and cut-through views of a segmented hollow fiber in an illustrative embodiment.
Figure 1B:
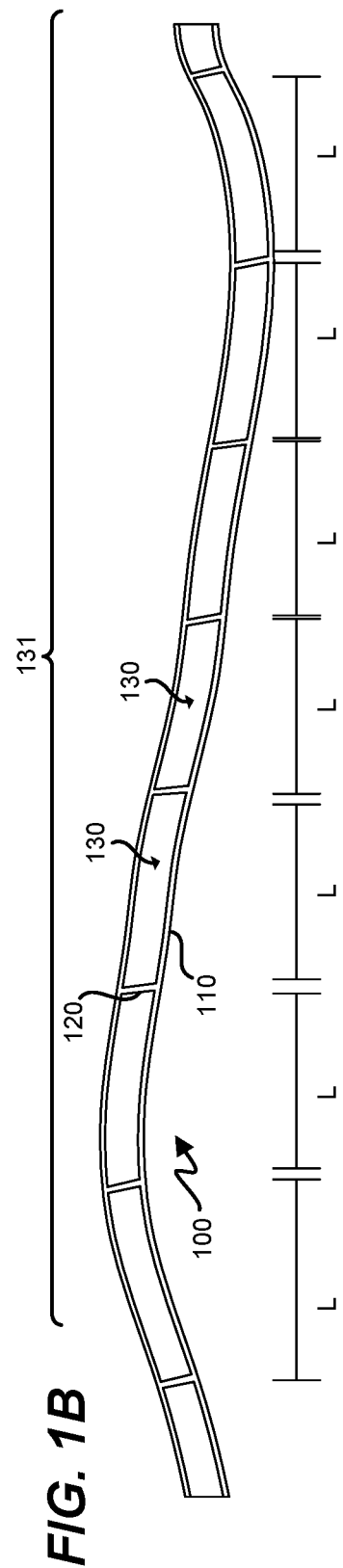

FIGS. 1A-1B depict an outside view (FIG. 1A) and a cut-through view (FIG. 1B) of a segmented hollow fiber 100 that is segmented in an illustrative embodiment. As shown in the exterior view provided in FIG. 1A, the segmented hollow fiber 100 includes exterior walls 110, and is made of a material 112. The material may comprise a glass, a polymer, another solid material, or any suitable combination thereof. In one embodiment, the segmented hollow fiber 100 is made of a single material (e.g., a single chemical or substance, as opposed to a combination thereof).

The cut-through view provided FIG. 1B illustrates that the segmented hollow fiber 100 also includes interior walls 120. The interior walls 120, in combination with the exterior walls 110, form a series 131 of multiple chambers 130 that are airtight and separated by lengthwise intervals L. The chambers 130, because they are hollow, reduce overall weight of the segmented hollow fiber 100 in comparison to a solid fiber. In an example, the chambers 130 reduce overall weight of the segmented hollow fiber 100 in comparison to a solid fiber by fifteen to sixty percent. The chambers 130 may have any desired length, such as less than three feet, less than two feet, less than one foot, less than six inches, less than an inch, etc. The chambers 130 are implemented to impart a hollowness ratio desired. The hollowness ratio is measured as an area of a hollow portion of a cross-section of the segmented hollow fiber 100 divided by an entire area of the cross section of the segmented hollow fiber 100, and may for example range between twenty and sixty percent.

Furthermore, the chambers 130 are airtight, which means that regardless of a length of segmented hollow fiber 100, water cannot penetrate deep into the hollow portions of the fiber. This concern pertaining to water penetration is substantial, as capillary action is capable of drawing water deep into a hollow fiber if the hollow fiber lacks airtight compartments. The segmented hollow fiber 100 may exhibit a particularly narrow diameter, such as less than a tenth of an inch, less than a hundredth of an inch, less than a thousandth of an inch, or even less than a ten thousandth of an inch. For example, in one embodiment, the range of diameter for fibers is designed to be between one and twenty microns (e.g., less than ten microns). Thus, the benefit of preventing capillary action/absorption of moisture is particularly pronounced for the segmented hollow fiber 100, because capillary action is more prevalent in hollow features that have smaller diameters.

Figure 2:
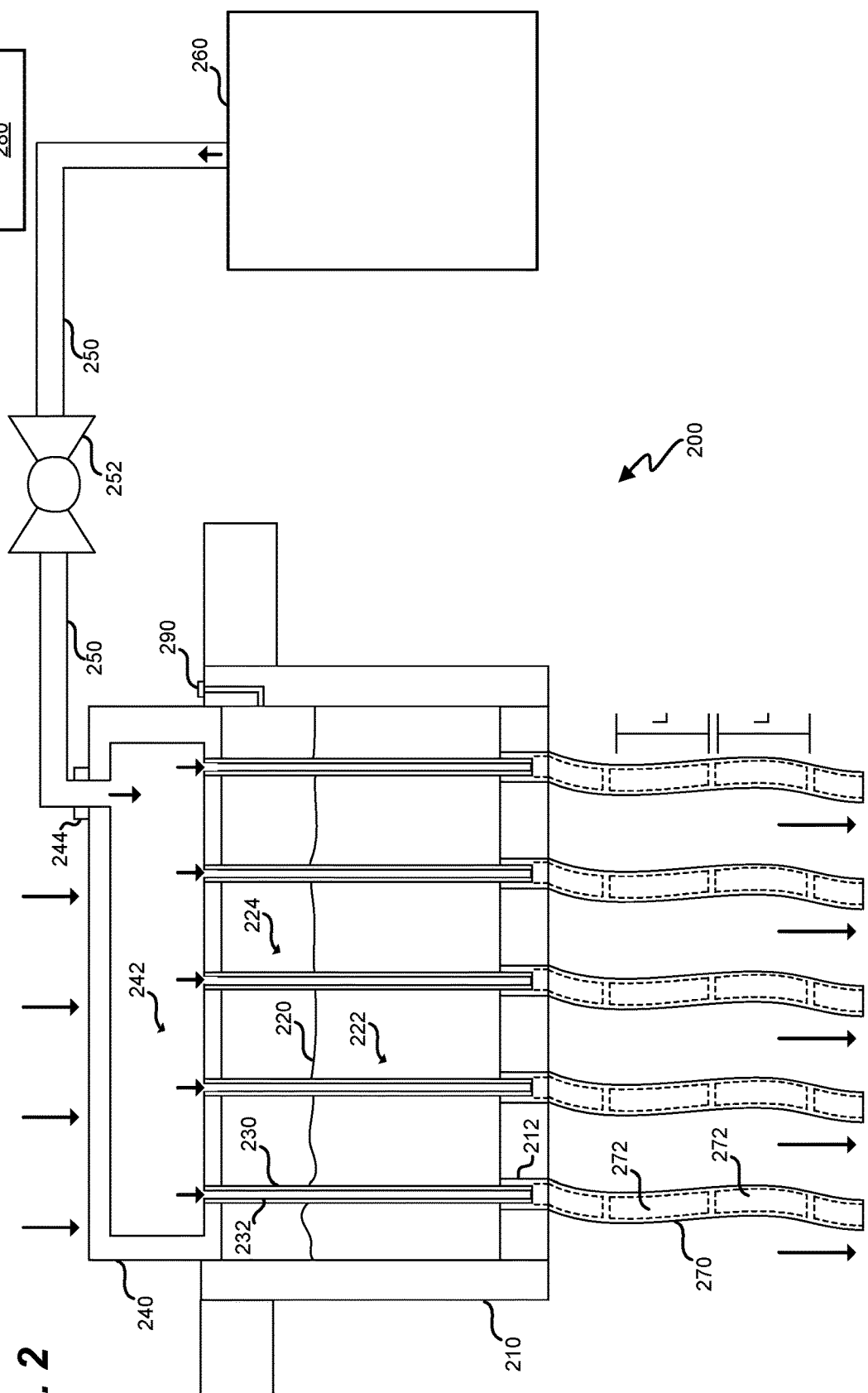
FIG. 2 depicts a system for fabricating segmented hollow fibers in an illustrative embodiment.

FIG. 2 depicts a system 200 for fabricating segmented hollow fibers 270 in an illustrative embodiment. System 200 is capable of rapidly fabricating batches of segmented hollow fibers 270 from a pool 220 of molten material 222, by pressing the molten material 222 through orifices 212 of a die 210. Die 210 may also be referred to as a "bushing." An array of injection needles 230 are supplied a gas (e.g., air or nitrogen), and controllably inject that gas into orifices 212 via their hollow portions 232. The hollow portions 232 of the injection needles 230 receive the gas via a hollow chamber 242 of a manifold 240 coupled with the injection needles 230. The diameter of the injection needles 230 may be, for example, between thirty to sixty percent of a diameter of the orifices 212. In one embodiment, fibers produced by system 200 have a diameter in the range of one hundred to several hundred microns. In a further embodiment, the hollow fibers produced using system 200 also undergo a thermal attenuation process wherein the segmented hollow fibers 270 are heated close to melting temperature (e.g., within ten degrees Fahrenheit (° F.) of melting), and are stretched to further reduce their diameter from one hundred or several hundred microns down to one to three microns. This technique substantially improves, compared to conventional hollow fibers, the usefulness of the segmented hollow fibers 270 for thermal insulation applications.

In this embodiment, a port 290 enables gas to be removed or added to volume 224. By adding gas and increasing pressure, molten material 222 is driven out of the orifices 212 of the die 210. Alternatively, by decreasing pressure, excess gas is removed from volume 224, drawing the pool 220 closer to the manifold 240. In still further embodiments, the manifold 240 is driven into the pool 220 in order to drive the molten material 222 through the orifices 212.

The manifold 240 receives the gas via a port 244, to which tubing 250 is attached. A control valve 252 selectively couples the manifold 240 with a pressure source 260 via the tubing 250. Throughout this process, a controller 280 controls the operations of control valve 252 in order to iteratively enable and then restrict flow of the gas via the array of injection needles 230.

By iteratively coupling the manifold 240 to the pressure source 260 and decoupling the manifold 240 from the pressure source 260 via control valve 252, the injection needles 230 iteratively insert pockets of gas into the molten material 222 passing through the orifices 212. This results in the molten material 222 exiting the orifices 212 with internal chambers/pockets of gas. The size of the pockets of gas is a function of air pressure outside of the die, and air pressure applied by the injection needles 230, amount of air applied by the injection needles, a difference in diameter between the injection needles 230 and the orifices 212, temperature, and other factors.

When the molten material 222 cools, it forms segmented hollow fibers 270 having airtight chambers 272 that are separated by lengthwise intervals L. In an example, the lengthwise intervals are regular lengthwise intervals of, e.g., every six inches. Other lengthwise intervals are possible as well. Although system 200 is illustrated as only including several injection needles 230, the needles are not depicted to scale, and system 200 may include hundreds, thousands, or tens of thousands of injection needles 230 which are aligned over corresponding orifices 212 in order to fabricate numerous segmented hollow fibers 270 at once.

Figure 3:
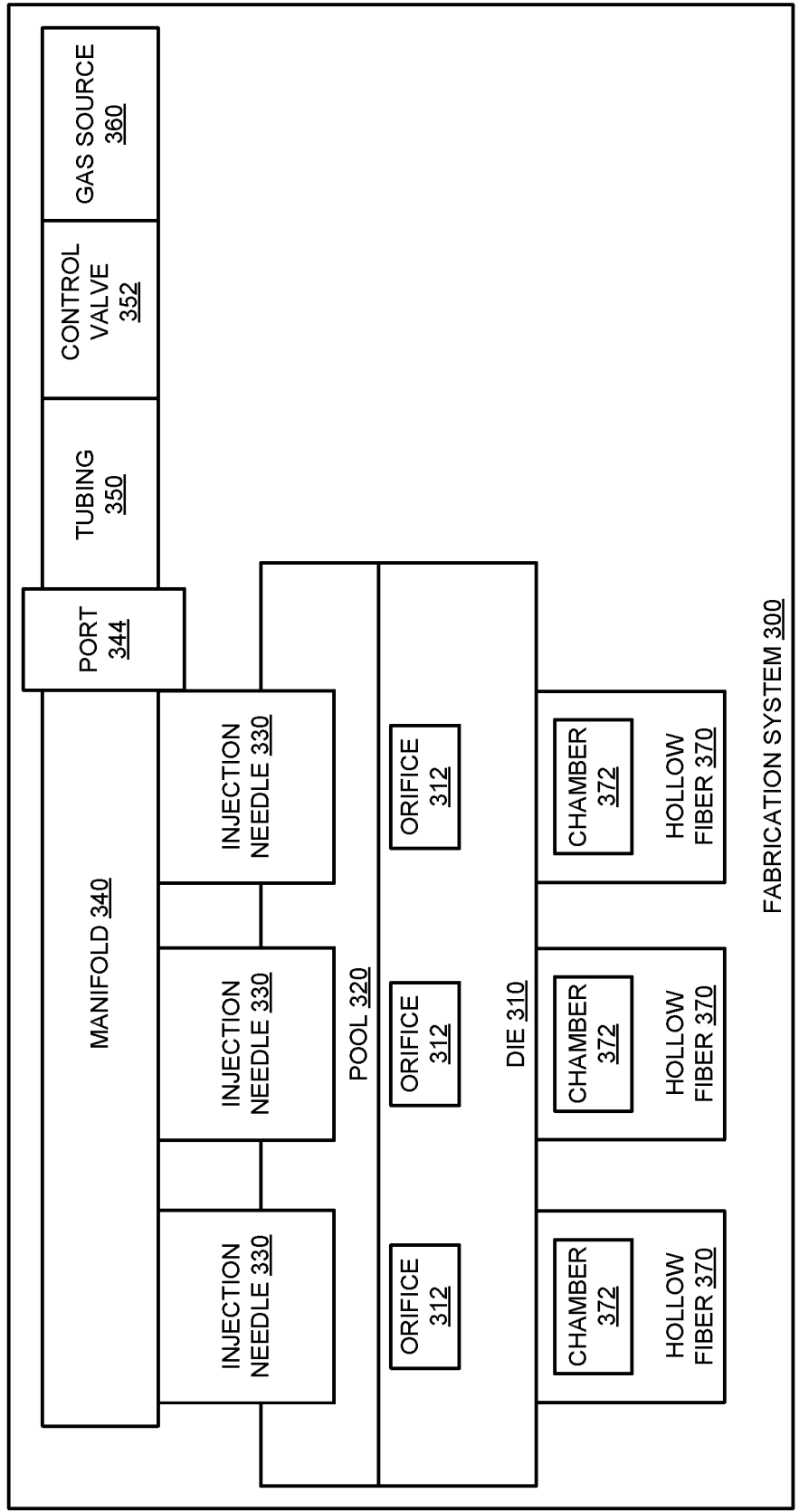
FIG. 3 is a block diagram depicting a system for fabricating segmented hollow fibers in an illustrative embodiment.

FIG. 3 is a block diagram depicting a system for fabricating segmented hollow fibers in an illustrative embodiment. In an example, the system depicted in FIG. 3 corresponds to the system of FIG. 2. As shown in FIG. 3, a gas source 360 of a fabrication system 300 provides gas in a controlled manner via control valve 352 and tubing 350, and through a port 344 to a manifold 340. The gas proceeds through injection needles 330 (which are immersed in pool 320) to orifices 312 within a die 310. The application of gas results in airtight chambers 372. Upon cooling, extruded molten material from the pool 320 cools, forming segmented hollow fibers 370.

Illustrative details of the fabrication of segmented hollow fiber 100 will be discussed with regard to FIG. 4. Given that the scale of a segmented hollow fiber 100 is quite small, and the quantity of segmented hollow fibers 100 used for an insulation blanket or carpet is particularly large (e.g., more than thousands), hand techniques and other low-volume fabrication techniques are generally unsuitable for providing the large volume of hollow fibers used in a real-world fabrication environment.

Figure 4:
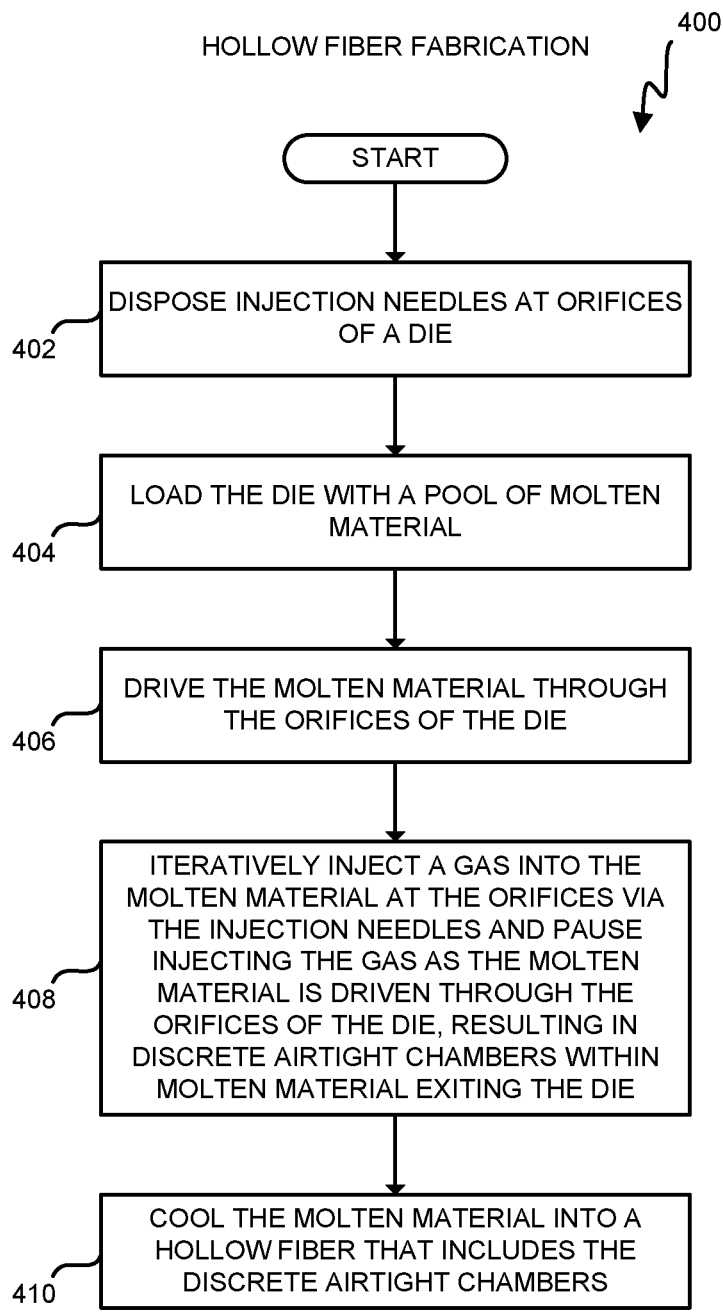
FIG. 4 is a flowchart illustrating a method for fabricating segmented hollow fibers in an illustrative embodiment.

Assume, for an example embodiment of FIG. 4, that no hollow fibers of any kind have yet been fabricated, and that a technician wishes to create a batch of segmented hollow fibers for use in an insulation blanket of an aircraft. In another example, no hollow fibers of any kind have yet been fabricated, and a technician wishes to create a batch of segmented hollow fibers for use in a carpet of an aircraft.

FIG. 4 is a flowchart illustrating a method 400 for fabricating segmented hollow fibers in an illustrative embodiment. The steps of method 400 are described with reference to system 200 of FIG. 2, but those skilled in the art will appreciate that method 400 may be performed in other systems. The steps of the flowcharts described herein are not all inclusive and may include other steps not shown. The steps described herein may also be performed in an alternative order.

Step 402 includes disposing injection needles 230 at orifices 212 of a die 210. In one embodiment, this comprises placing ends of the injection needles 230 within the orifices 212, while in further embodiments this comprises placing ends of the injection needles 230 just below (e.g., by a fraction of an inch, such as less than one hundredth of an inch) the orifices 212.

Step 404 includes loading the die 210 with a pool 220 of molten material 222. In one embodiment, this comprises pumping in molten material 222 from a port into the die 210, or pouring the molten material 222 into the die 210. In one embodiment, the die 210 is heated above a melting temperature of the molten material 222 prior to loading. This ensures that when molten material 222 contacts a wall of the die 210, the molten material does not cool and become solid. The molten material 222 may comprise molten glass, molten polymer (e.g., nylon, polyester, etc.).

Step 406 includes driving the molten material 222 through the orifices 212 of the die 210. This operation is completed via any suitable process, such as via the application of pressurized gas to a volume 224 above the pool 220 via port 290, or by physically driving manifold 240 into the pool 220.

Step 408 includes iteratively injecting a gas into the molten material 222 at the orifices 212 via the injection needles 230, followed by pausing injecting the gas as the molten material 222 is driven through the orifices 212 of the die 210, thereby forming a segmented hollow fiber 270. That is, control valve 252 is operated iteratively on and off such that gas is iteratively injected, then paused, then injected again. The amount of gas applied by each injection needle 230 is miniscule (e.g., microliters or picoliters of volume), but is sufficient to create an airtight chamber within the molten material 222. This may result in a hollowness ratio between twenty and sixty percent within the molten material 222. This results in airtight chambers 272, which are discrete with respect to each other and are hollow.

In order to fabricate chambers that proceed for a desired length along the fiber, the control valve 252 may be turned on for a first duration/period of time (e.g., to generate an airtight chamber having a length of less than three feet, less than two feet, less than one foot, or less than six inches), then turned off for a second duration/period of time that is shorter than the first. The length of the first duration of time and the second duration of time may be selected based on the desired properties (e.g., desired length) of the series of airtight chambers within the segmented hollow fiber. As the molten material 222 advances through the orifices 212 during the first duration, the gas is applied at a predefined pressure, and the length of the airtight chambers 272 increases. As the molten material 222 advances through the orifices during the second duration, the injection of gas is paused, and a wall is formed that delineates a boundary between the airtight chambers 272. The amount of volumetric airflow applied during each of these durations may vary as a function of desired fabrication rate and throughput of molten material 222 through the orifices 212.

In step 410, the molten material 222 is cooled into segmented hollow fibers 270 that include the airtight chambers 272, which are hollow and discrete from each other. In one embodiment, this comprises air cooling the molten material 222 via active means (e.g., via a fan or liquid sprayer) or passive means.

In many embodiments, pressure source 260 applies gas at a predefined pressure that is higher than atmospheric pressure in order to form the airtight chambers 272. However, in a further embodiment, the method is performed within a low pressure environment, such as within a vacuum. In such embodiments, pressure source 260 can apply gas at a predefined pressure that is less than atmospheric pressure in order to form the airtight chambers 272. This can be utilized to tune the segmented hollow fibers 270 to an expected range of operational pressures, and can also be used to reduce the weight of gas trapped within the resulting segmented hollow fibers 270. For example, if the segmented hollow fibers 270 are to be utilized in an unpressurized portion of an aircraft (or spacecraft), then they may be expected to be exposed to low pressures and temperatures. Calibrating the pressure and volume of gas applied to each airtight chamber 272 can ensure that differences in pressure and temperature during operation do not cause walls of the airtight chambers to rupture.

In further embodiments, a difference between radius of an orifice 212 and radius of an injection needle 230 is dimensioned in order to control wall thickness. This can be performed in order to reduce weight (e.g., by thinning the walls) or increase strength (e.g., by thickening the walls). Similar techniques, such as adjusting a period during which gas is not applied, can be used to increase or decrease the thickness of internal walls between airtight chambers. In further embodiments, the amount of gas applied by the injection needle is adjusted to control wall thickness. After the segmented hollow fibers 270 have been completed, they can be aggregated together into an insulation blanket, woven into a carpet of an aircraft, etc.

Method 400 provides a technical benefit over prior techniques, because it enables the weight-saving benefits of utilizing hollow fibers, while also preventing moisture infiltration into such materials. This ensures that components made from these materials do not increase in weight during operation (e.g., due to water accumulation), and also ensures that components made from these materials are easy to clean (e.g., because dirt and debris does not become trapped or lodged in the materials).

Figure 5:
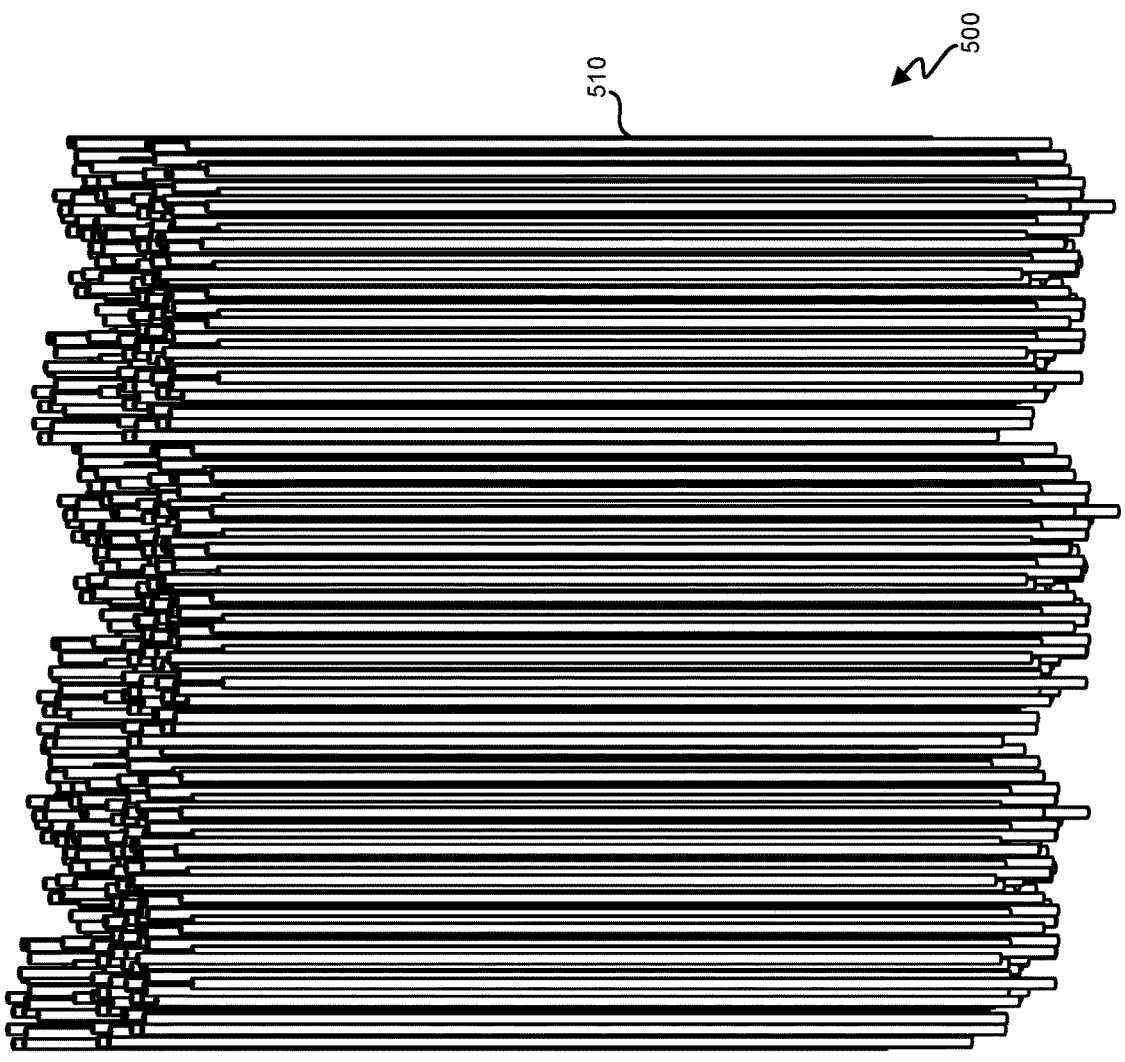
FIG. 5 depicts a bundle of segmented hollow fibers in an illustrative embodiment.

FIG. 5 depicts a bundle 500 of segmented hollow fibers 510 in an illustrative embodiment. A bundle 500 of segmented hollow fibers 510 may be wrapped in a film, tied together, or otherwise secured in place in order to form an insulating barrier. In one embodiment, a large bundle of segmented hollow fibers are aggregated together and utilized as a lightweight insulation blanket. The airtight chambers of the fibers, when aggregated together across many fibers in an insulation blanket, form an insulating barrier that resists heat transfer. The insulation blanket is then installed into an interior of an aircraft. In further embodiments, the segmented hollow fibers 510 within the bundle 500 are randomly oriented.

Figure 6:
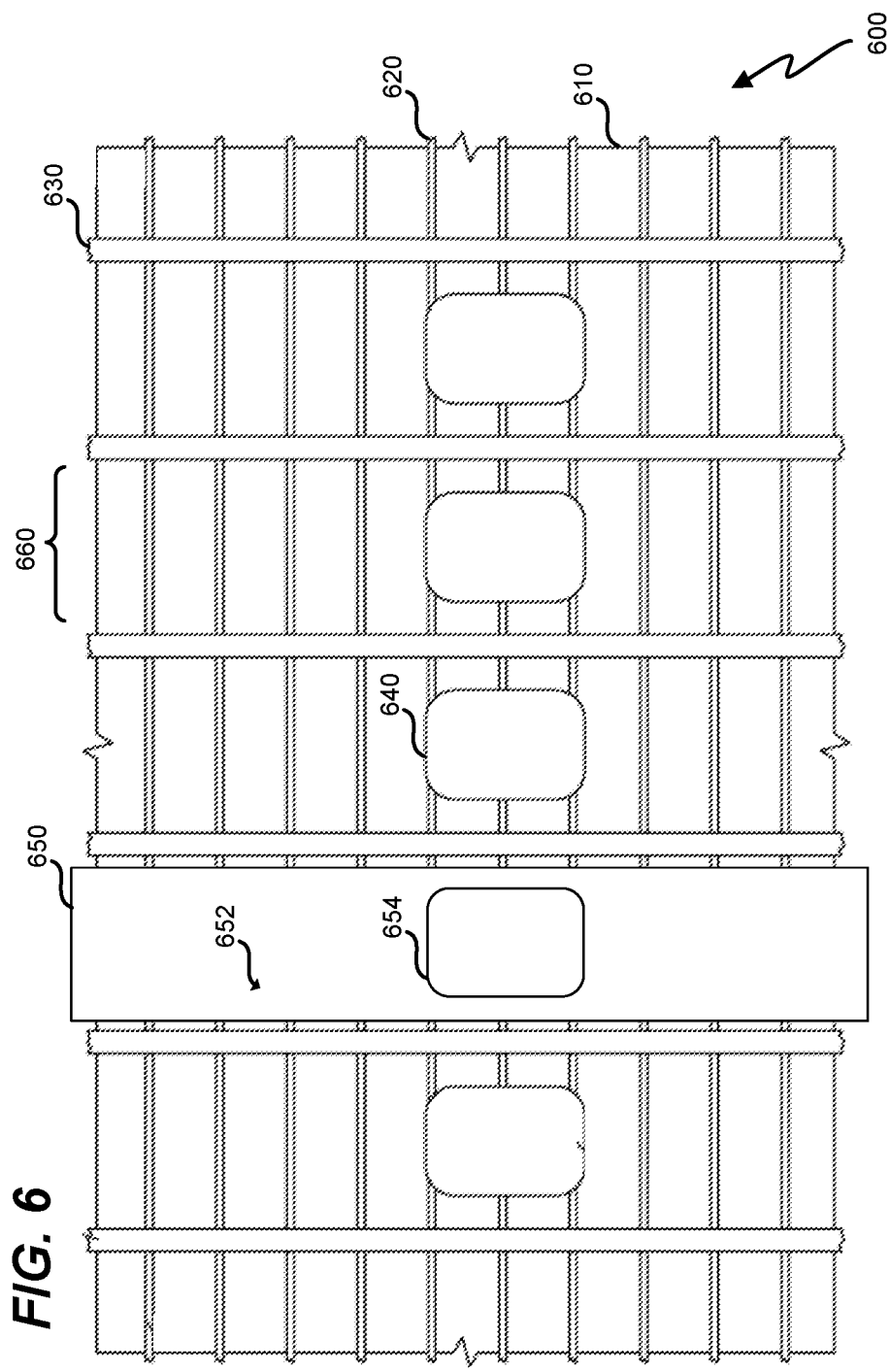
FIG. 6 depicts an insulation blanket comprising a bundle of segmented hollow fibers in an illustrative embodiment.

FIG. 6 depicts an insulation blanket 650 comprising a bundle of segmented hollow fibers in an illustrative embodiment. Fibers within the insulation blanket may be oriented in the same direction, or may be randomly oriented. In this embodiment, the insulation blanket 650 is installed (e.g., tied, strapped, glued, affixed via fasteners, etc.) within a bay 660 between frames 630 of a section 600 of fuselage that includes stringers 620 and a skin 610. Each bay 660 includes a window 640, and insulation blanket 650 includes a cut-out 654 to accommodate a window. Furthermore, insulation blanket 650 is surrounded by a cover 652, which facilitates handling of the segmented hollow fibers within it.

With a discussion provided above of a first method of fabrication and a first application for segmented hollow fibers, further discussion with regard to the following FIGS. 7-11 focuses on a second method of fabrication and a second application for segmented hollow fibers.

Figure 7:
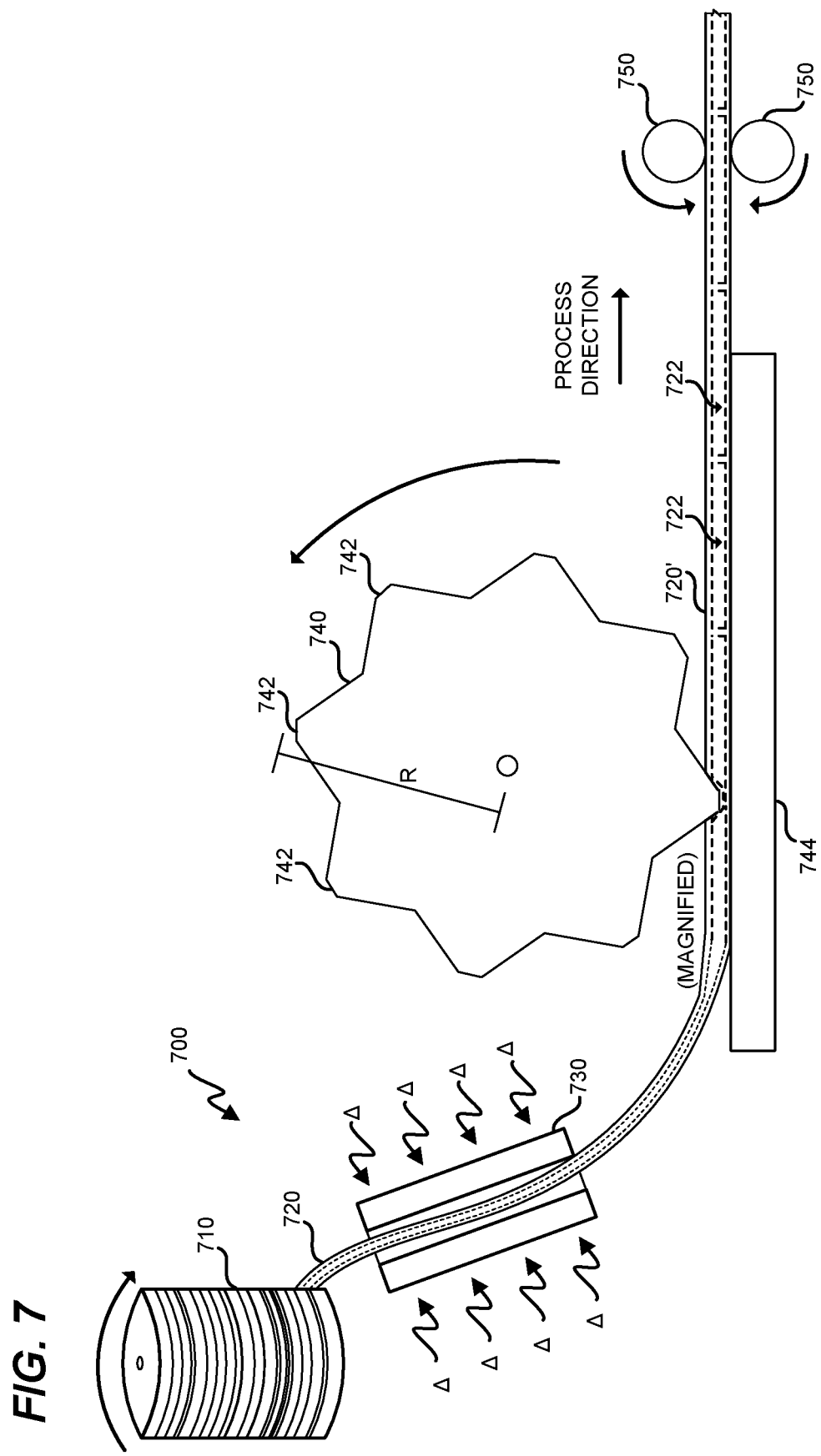
FIG. 7 depicts a further system for fabricating segmented hollow fibers in an illustrative embodiment.

FIG. 7 depicts a further system 700 for fabricating segmented hollow fibers in an illustrative embodiment. According to FIG. 7, a spindle 710 includes one or more hollow fibers 720 wrapped around it. The spindle 710 rotates at a set speed, which advances a hollow fiber 720 through a heater 730. The heater 730 applies heat (A) to the hollow fiber 720, increasing the temperature of the hollow fiber 720 to a tacking temperature of a material that the hollow fiber 720 is made from. As used herein, a "tacking temperature" may refer to when a material enters a viscous and tacky state, such that under pressure adjacent pieces of material fuse together. For flexible materials such as certain polymers and elastomers, a "tacking temperature" may refer to a temperature just below a melting temperature (e.g., within five degrees Fahrenheit (° F.) of a melting temperature, within ten ° F. of a melting temperature, etc.). For materials which solidify into a brittle state, a tacking temperature may refer to a glass transition temperature. Next, the hollow fiber 720 advances to a rotary element 740.

The rotary element 740 spins, which causes projections 742 (at an outer radius R from a center of the rotary element 740) to iteratively compress the hollow fiber 720 at regular intervals. The projections 742 may comprise planar faces of the rotary element 740, which ramp outward from the rotary element 740 and form any desirable shape. These shapes may include triangles, trapezoids, squares, rectangles, etc. In an example, the projections 742 iteratively compress the hollow fiber 720 at regular lengthwise intervals of, e.g., every six inches. Other lengthwise intervals are possible as well. Compression while the hollow fiber 720 is at or near a tacking temperature causes compressed portions of the hollow fiber 720 to stick together, resulting in internal walls that, when cooled, form airtight chambers 722 within the hollow fiber. This converts the hollow fiber 720 into a segmented hollow fiber 720' exhibiting the benefits discussed above. The amount of pressure applied by the projections 742 to the hollow fiber depend upon the hollowness ratio of the hollow fiber 720, a hardness of the hollow fiber 720, chemical properties of the hollow fiber 720, a consolidation pressure of the hollow fiber 720 (while the hollow fiber 720 is in a heated state), and other factors.

In further embodiments, heater 730 is not utilized, and instead the rotary element 740 itself, and/or a working surface 744, is heated in order to achieve a desired temperature for the hollow fiber 720 during compression.

Pinch rollers 750 are actively rotated via a motor or actuator, and draw cooled/hardened portions of the segmented hollow fiber 720' forward in a process direction at a predetermined rate. In one embodiment, the rate at which the segmented hollow fiber 720' is drawn forward is equal to a rate of rotation of the rotary element 740.

In further embodiments, system 700 includes multiple spindles, or multiple fibers from a single spindle. In such embodiments, the heater 730, rotary element 740, and pinch rollers 750 may be sized to facilitate the production of a plurality of segmented hollow fibers (e.g., thousands of fibers) at once. In other examples, the system 700 may include a plurality of heaters 730, a plurality of rotary elements 740, and a plurality of pinch rollers 750.

Figure 8:
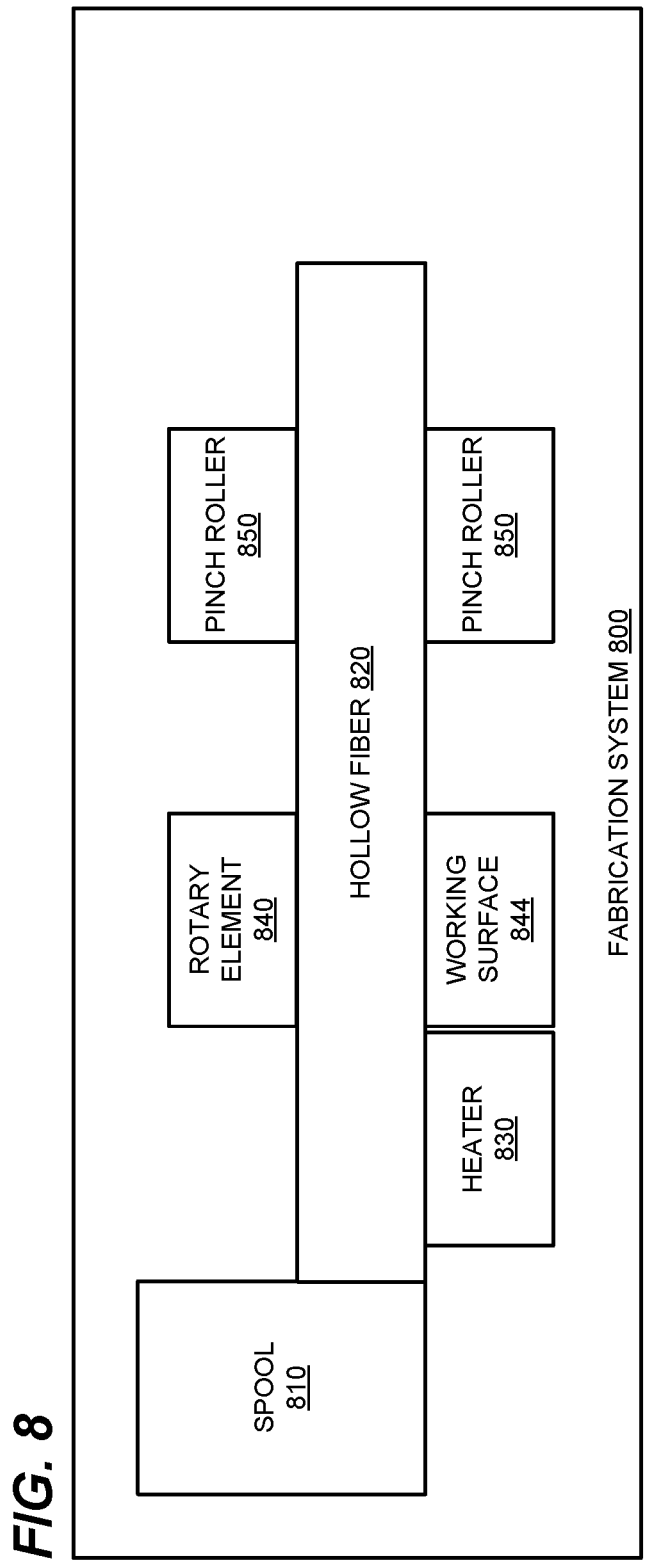
FIG. 8 is a block diagram depicting a further system for fabricating segmented hollow fibers in an illustrative embodiment.

FIG. 8 is a block diagram depicting a system for fabricating segmented hollow fibers in an illustrative embodiment. In an example, the system depicted in FIG. 8 corresponds to the system of FIG. 7. According to FIG. 8, fabrication system 800 includes a spool 810, from which one or more hollow fibers 820 are unwound. The hollow fibers 820 at the spool are not yet segmented, but will be after they travel through the fabrication system 800. A heater 830 heats the hollow fibers 820 to a tacking temperature of a material that the hollow fibers 820 are made from, and a rotary element 840 compresses the hollow fibers 820 into a substantially flat working surface 844 at regular intervals while the hollow fibers 820 are at or above the tacking temperature. Pinch rollers 850 draw the hollow fibers 820 (which are now segmented) in a process direction at a desired rate of fabrication.

Figure 9:
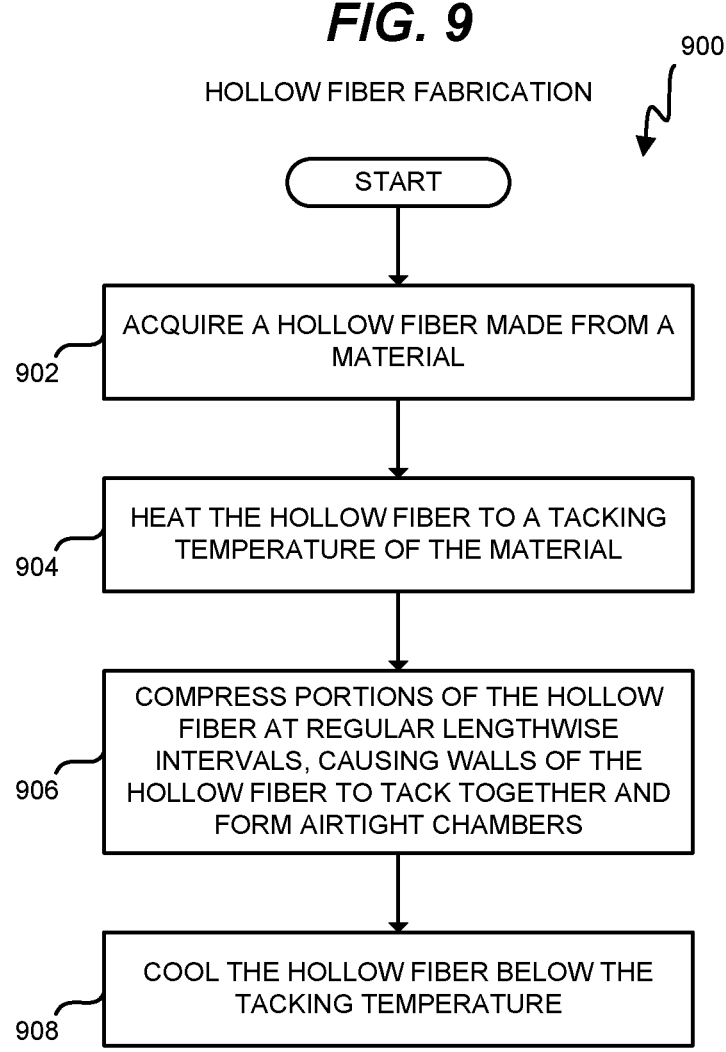
FIG. 9 is a flowchart illustrating a further method for fabricating segmented hollow fibers in an illustrative embodiment.

FIG. 9 is a flowchart illustrating a further method 900 for fabricating segmented hollow fibers in an illustrative embodiment. The steps of method 900 are described with reference to system 700 of FIG. 7, but those skilled in the art will appreciate that method 900 may be performed in other systems.

Assume, for an example embodiment of FIG. 9, that a large number of hollow fibers 720 have been fabricated and placed onto one or more spindles 710, but that the hollow fibers 720 are not yet segmented and hence are vulnerable to the water penetration issues discussed above in the specification.

Step 902 includes acquiring one or more hollow fibers 720 made from a material, such as a polymer (e.g., nylon, polyester) or a glass. In one embodiment, acquiring the hollow fibers 720 includes loading a new spindle 710 in position, and feeding the hollow fibers 720 between the pinch rollers 750.

Step 904 includes heating the hollow fibers 720 to a tacking temperature of the material. In one embodiment, this operation is performed by a dedicated heater 730 as the hollow fibers 720 advance forward, while in further embodiments, heating is performed by the rotary element 740, alone or in combination with the working surface 744. The amount of heat applied to the hollow fibers 720 is a function of an initial temperature of the hollow fibers 720, an amount of heat transfer to the hollow fibers 720 during heating, and a duration of time that the hollow fibers 720 are heated. The duration of time that the hollow fibers 720 are heated is a function of speed at which the hollow fibers 720 are moved in the process direction. Thus, to achieve a desired tacking temperature without entirely melting the hollow fibers, a temperature of the heating elements and a rate of speed of the hollow fibers 720 is controlled.

Step 906 comprises compressing portions of the hollow fibers 720 at regular lengthwise intervals, causing walls of each of the hollow fibers 720 to tack together and form airtight chambers 722. In one embodiment, this is performed by rotary element 740 rotating in place as the hollow fiber 720 advances. In further embodiments, this comprises rotary element 740 rolling in a direction across the hollow fibers 720, then lifting, returning to an initial position, lowering, and repeating the process. In either embodiment, compressing portions of the hollow fibers 720 is performed by projections 742 of the rotary element 740. In one embodiment, a rate of travel of an outer radius (R, of FIG. 7) of the rotary element 740 is set equal to a rate of travel of the hollow fibers 720 in the process direction. That is, an amount of distance along the outer radius traveled by a projection 742 of the rotary element per unit of time is equal to an amount of distance in the process direction traveled by the hollow fibers 720 in the same unit of time.

Step 908 comprises cooling the hollow fibers 720 (which are now segmented) below the tacking temperature. This causes the hollow fibers 720 to completely harden, which prevents the hollow fibers 720 from adhering to each other after fabrication has been completed. After the segmented hollow fibers have been completed, they can be aggregated together into an insulation blanket, woven into a carpet of an aircraft, etc.

Like method 400, method 900 provides a technical benefit over prior techniques, because it enables the weight-saving benefits of utilizing hollow fibers, while also preventing moisture infiltration into such materials. This ensures that components made from these materials do not increase in weight during operation (e.g., due to water accumulation), and also ensures that components made from these materials are easy to clean (e.g., because dirt and debris does not become trapped or lodged in the materials. The segmented hollow fibers fabricated by method 900 may be integrated, for example, into an insulation blanket of an aircraft or into a carpet of an aircraft.

Figure 10:
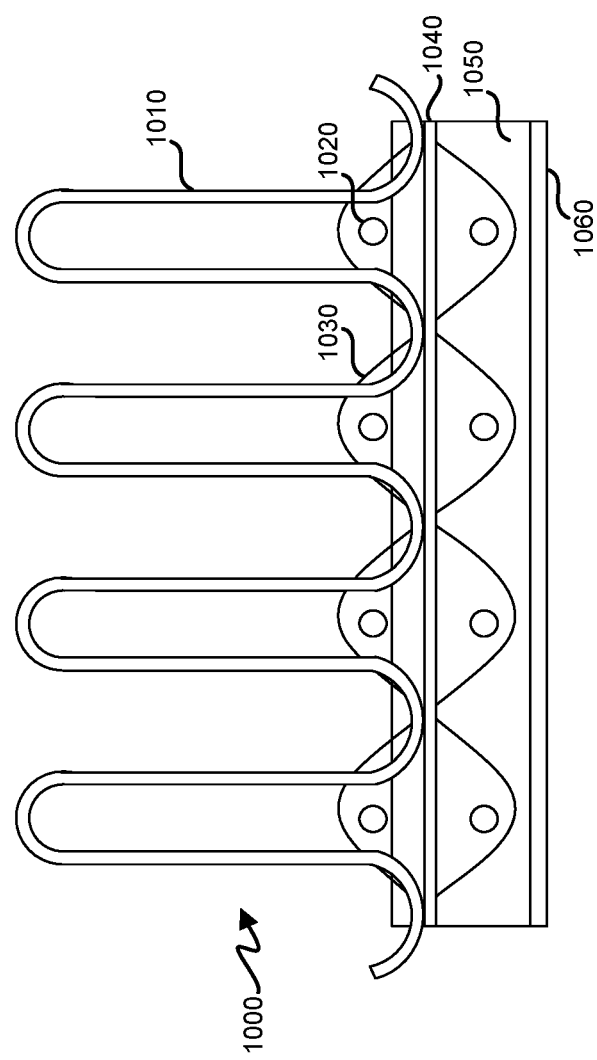
FIG. 10 depicts a side view of a carpet woven from segmented hollow fibers in an illustrative embodiment.

FIG. 10 depicts a side view of a carpet 1000 woven from segmented hollow fibers in an illustrative embodiment. That is, by weaving segmented hollow fibers into a carpet of an aircraft, the carpet 1000 of FIG. 10 is created. In this embodiment, the carpet 1000 includes a pile yarn 1010, a weft 1020, a chain warp 1030, and a stuffer warp 1040. Any and/or all of the components discussed above may be fabricated as segmented hollow fibers, thereby saving weight while preventing water penetration caused by capillary action. For instance, any and/or all of the components discussed above may be fabricated with the segmented hollow fibers illustrated in FIG. 1-3, 5, or 7-8. FIG. 10 further depicts a backing 1050 as well as an adhesive layer 1060. In one embodiment, the backing 1050 comprises a chemical foam, such as a polymeric foam having large cells (e.g., open cells or closed cells) formed from a solution of polymer and gas. The large cell size further lowers the density of the carpet 1000, reducing weight. The adhesive layer 1060 facilitates rapid installation of the carpet, and secures the carpet in place, for example at an aircraft.

Figure 11:
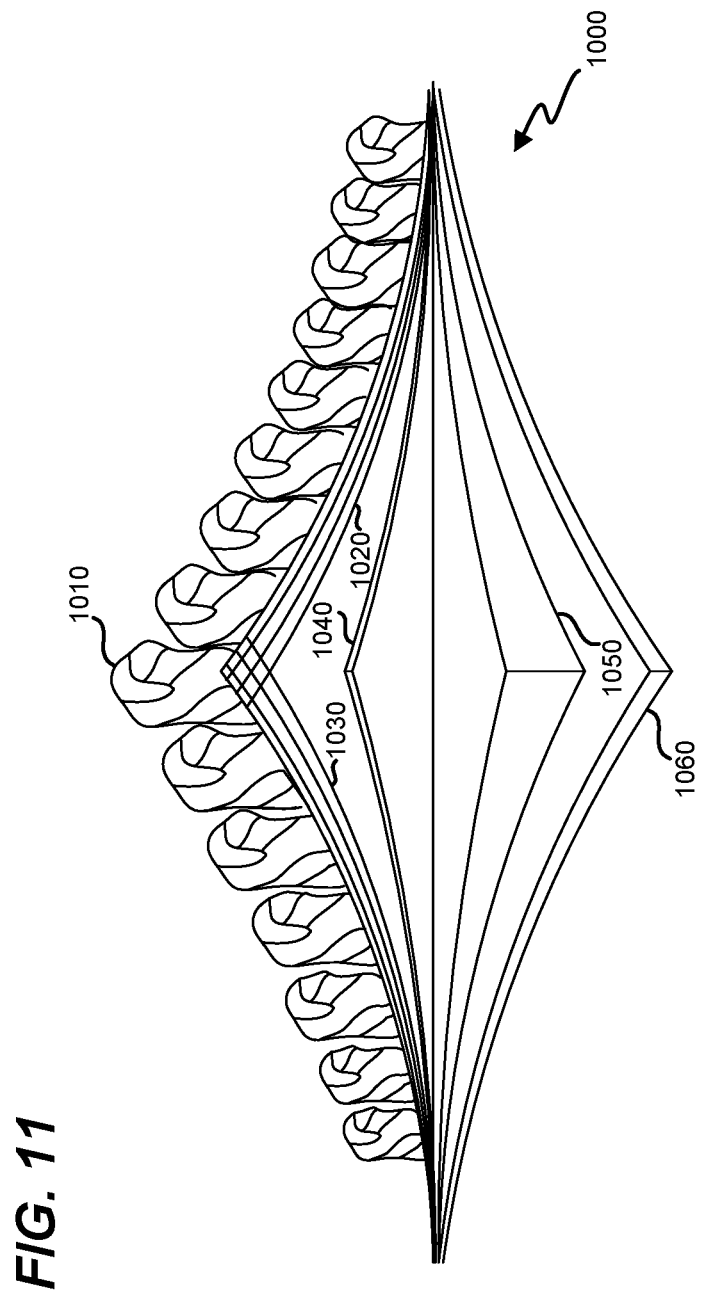
FIG. 11 depicts a partially unfolded view of a carpet woven from segmented hollow fibers in an illustrative embodiment.

FIG. 11 depicts a partially unfolded view of a carpet 1000 woven from segmented hollow fibers in an illustrative embodiment. FIG. 11 depicts the various layers of FIG. 10, illustrating adhesive layer 1060 and backing 1050, as well as stuffer warp 1040. FIG. 11 makes clear that chain warp 1030 and weft 1020 occupy the same layer, and cross each other at regular intervals to form a weave. Meanwhile, pile yarn 1010 rises above the chain warp 1030 and weft 1020, providing a cushioned surface for receiving foot traffic.

EXAMPLES

In the following examples, additional processes, systems, and methods are described in the context of a fabrication system for segmented hollow fibers.

Figure 12:
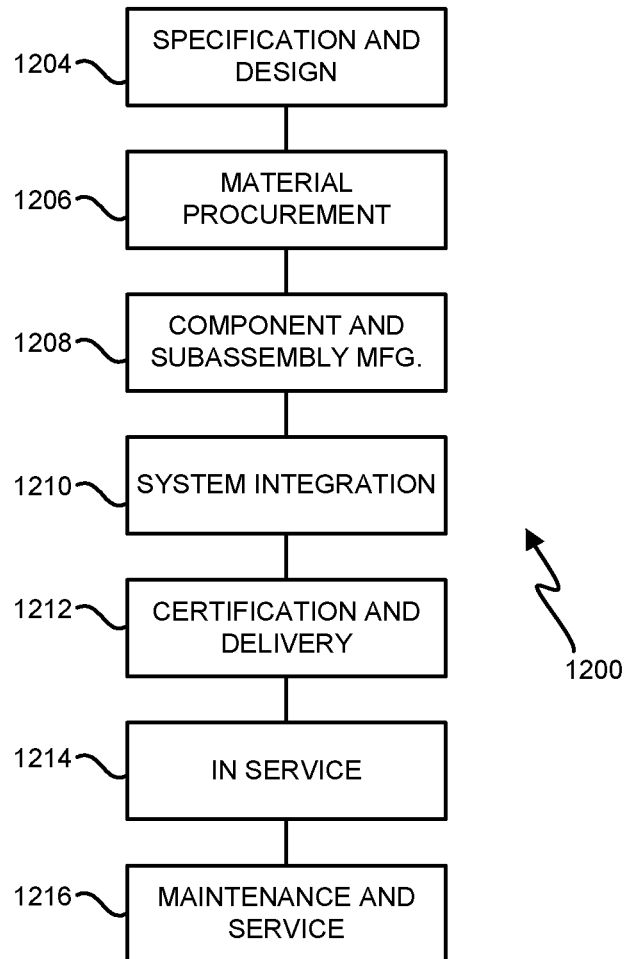
FIG. 12 is a flow diagram of aircraft production and service methodology in an illustrative embodiment.
Figure 13:
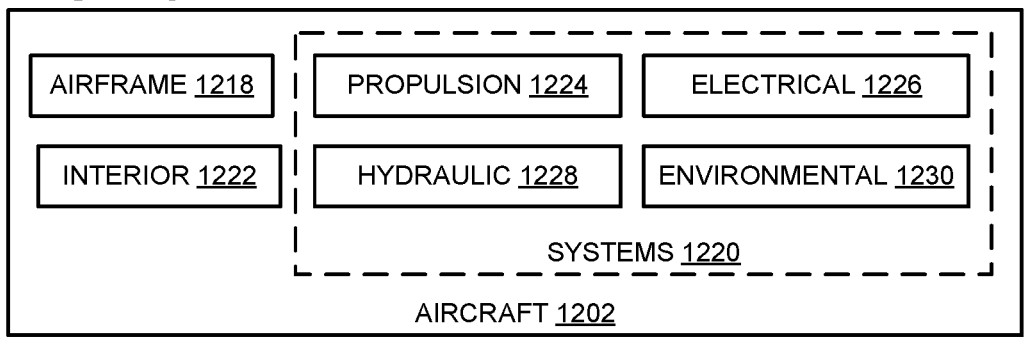
FIG. 13 is a block diagram of an aircraft in an illustrative embodiment.

Referring more particularly to the drawings, embodiments of the disclosure may be described in the context of aircraft manufacturing and service in method 1200 as shown in FIG. 12 and an aircraft 1202 as shown in FIG. 13. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the present disclosure may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service. Also, one or more apparatus embodiments, method embodiments, or a combination thereof may be utilized during the subassembly manufacturing 1208 and system integration 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. Thus, embodiments of the present disclosure may be used in any stages discussed herein, or any combination thereof, such as specification and design 1204, material procurement 1206, component and subassembly manufacturing 1208, system integration 1210, certification and delivery 1212, service 1214, maintenance and service 1216 and/or any suitable component of aircraft 1202 (e.g., airframe 1218, systems 1220, interior 1222, propulsion system 1224, electrical system 1226, hydraulic system 1228, and/or environmental 1230).

In one embodiment, a part comprises a portion of interior 1222, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to manufacture new parts.

Any of the various control elements (e.g., electrical or electronic components that operate controllable actuators, controllable valves, controllable pressure systems, etc.) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method for fabricating a segmented hollow fiber, the method comprising:
    disposing injection needles at orifices of a die, wherein the injection needles receive a gas under pressure from an interior of a manifold;
    loading the die with a pool of molten material, wherein the manifold is movable within the die to generate a pressure on the molten material within the die;
    adjusting a position of the manifold within the die to adjust the pressure within the die;
    driving the molten material through the orifices of the die by increasing the pressure on the molten material by driving the manifold into the die toward the pool of the molten material;
    iteratively injecting the gas into the molten material at the orifices via the injection needles and pausing injecting the gas as the molten material is driven through the orifices of the die, resulting in discrete hollow chambers within molten material exiting the die; and
    cooling the molten material into the segmented hollow fiber that includes the discrete hollow chambers.

2. The method of claim 1 wherein:
    the iteratively injecting the gas into the molten material at the orifices via the injection needles and pausing injecting the gas comprises applying the gas at a predefined pressure for a first duration, followed by pausing injecting the gas for a second duration.

3. The method of claim 2 wherein:
    the second duration is shorter than the first duration.

4. The method of claim 2 wherein:
    the predefined pressure is higher than atmospheric pressure.

5. The method of claim 1 further comprising:
    aggregating the segmented hollow fiber with other fabricated segmented hollow fibers to form an insulation blanket; and
    installing the insulation blanket into an interior of an aircraft.

6. The method of claim 1 wherein:
    the driving the molten material through the orifices comprises driving the manifold coupled with the injection needles into the pool.

7. A method for fabricating a segmented hollow fiber, the method comprising:
    unwrapping, from a spindle, a hollow fiber made from a material, the hollow fiber being unsegmented;
    advancing the hollow fiber through a heater which is positioned downstream of the spindle, and which heats the hollow fiber to a tacking temperature of the material;
    advancing the hollow fiber, heated to the tacking temperature, toward a rotary element having an outer circumference and having a plurality of protrusions disposed around the outer circumference of the rotary element;
    applying pressure by each one of the plurality of protrusions, sequentially, on the hollow fiber to compress different portions of the hollow fiber at lengthwise intervals, causing walls of the hollow fiber to tack together and form airtight chambers, thereby forming the segmented hollow fiber, wherein the hollow fiber is compressed, by the each one of the plurality of protrusions, against a substantially flat working surface; and
    cooling the segmented hollow fiber below the tacking temperature.

8. The method of claim 7, wherein:
    the lengthwise intervals are equal lengthwise intervals.

9. The method of claim 7 further comprising:
    feeding the hollow fiber between pinch rollers that draw the hollow fiber in a process direction.

10. The method of claim 7 wherein:
    a rate of travel of an outer radius of the rotary element is equal to a rate of travel of the hollow fiber.

11. The method of claim 7 wherein:
    the method is performed on a plurality of hollow fibers at once.

12. The method of claim 7 further comprising:
    weaving the segmented hollow fiber with other fabricated segmented hollow fibers into a carpet of an aircraft.

13. The method of claim 7 wherein:
    the material comprises a polymer.

14. The method of claim 1 further comprising:
    weaving the segmented hollow fiber with other fabricated segmented hollow fibers to form a carpet.

15. The method of claim 1 further comprising:
    integrating the segmented hollow fiber with other fabricated segmented hollow fibers into an insulation blanket of an aircraft.

16. The method of claim 7 further comprising:
    weaving the segmented hollow fiber with other fabricated segmented hollow fibers to form a carpet.

17. The method of claim 7 further comprising:
integrating the segmented hollow fiber with other fabricated segmented hollow fibers into an insulation blanket of an aircraft.

18. The method of claim 1 further comprising:
prior to cooling the molten material, stretching the molten material to reduce a diameter of the discrete hollow chamber.

\* \* \* \* \*